W. H. CLARK.
Automatically and Positively Adjustable Crank.
No. 215,435. Patented May 20, 1879.
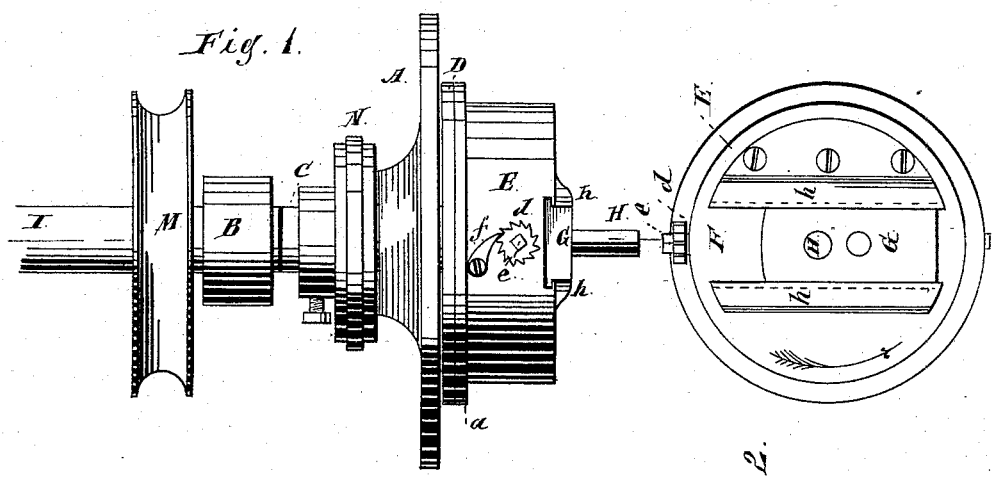
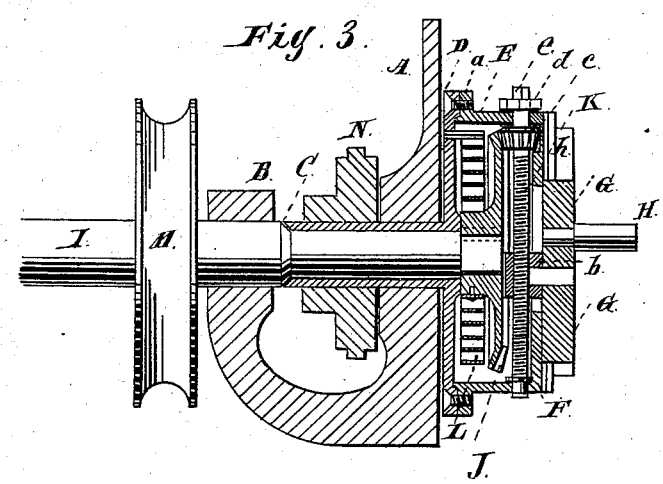
Witnesses:
Inventor:
William H. Clark

UNITED STATES PATENT OFFICE.

WILLIAM H. CLARK, OF CHICAGO, ILLINOIS.

IMPROVEMENT IN AUTOMATICALLY AND POSITIVELY ADJUSTABLE CRANKS.

Specification forming part of Letters Patent No. 215,435, dated May 20, 1879; application filed January 31, 1879.

*To all whom it may concern:*

Be it known that I, WILLIAM H. CLARK, of the city of Chicago, Cook county, State of Illinois, have invented new and useful Improvements in Automatically and Positively Adjustable Cranks, of which the following is a full description, reference being had to the accompanying drawings, in which—

Figure 1 is a side elevation; Fig. 2, an end elevation; Fig. 3, a central vertical longitudinal section. Fig. 4 shows a modification.

My improvement is primarily designed to be used in connection with hydraulic engines; but it is not limited to such use. When the engine has but little work to do a short stroke will be sufficient; but when more work is to be done, a greater stroke will be required.

The object of my invention is to so construct a crank and mechanism connected therewith that the distance of the crank-pin from the center will be, if desired, automatically adjusted, increasing or diminishing the length of stroke, within certain limits, according to the work to be done, and also so that, if desired, the crank-pin can be adjusted by hand at different distances from the center, and be there held in any position in which it may be placed until changed by an operator, all of which I accomplish by means of devices herein described.

In the drawings, A represents part of any suitable frame, in which is a bearing for a driving-shaft, and B is another bearing for such shaft. These bearings are arranged as shown simply for convenience.

C is a sleeve supported in the bearing in frame A. D is a disk or plate permanently attached to the sleeve C. The sleeve C and disk D may be cast together.

E is a rim or case, within which many of the parts are located. As shown, it is provided with a flange, *a*, and is secured to disk D by means of screws or bolts, which pass through disk D and flange *a*.

F is a crank-disk, having a central opening or slot for the nut *b*. It may be cast with the part E. G is a sliding frame or plate, which moves in guides *h* on the disk F. H is the crank-pin.

I is the driving-shaft. It is supported in the bearing B and sleeve C, as shown. That portion which passes through the sleeve is smaller than the remaining part. This sleeve and all the parts connected therewith can rotate independently of the shaft, the sleeve rotating around the shaft and in the bearing in A, and the shaft can rotate in the sleeve.

J is a bevel-gear wheel upon the end of the shaft I and within E. K is a screw, which rotates in bearings in the rim E. *b* is a nut secured to the inside of the sliding frame G. *c* is a small bevel-pinion wheel secured upon the screw K, and arranged so as to engage with the bevel-gear wheel J.

*d* is a ratchet-wheel, secured to the screw K outside of the rim E. *e* is a projecting end of the screw K, adapted to receive a wrench. *f* is a pawl, arranged to engage with the ratchet-wheel *d*.

The parts *d e f* are not necessary when the device operates automatically, but are to be used when the same is adjusted by hand.

L is a helical spring located, as shown, between disk D and bevel-gear wheel J, one end of which is fastened to the shaft I or to the hub of the wheel J, and the other end to the rim E or to a pin attached to disk D. This spring is so arranged that its resistance is counter to that of the shaft I.

M is a wheel upon the shaft I. It is shown only for the purpose of indicating one place or manner of using the power applied to the shaft.

N is the eccentric which operates the valve which admits water in a hydraulic engine.

The spring L is arranged to hold the sliding frame and crank-pin in the position which they occupy when the engine is working at its shortest stroke, and as shown in Fig. 3. The crank-pin is to be connected with a pitman-rod, as usual.

The operation is as follows: Suppose the power applied and the crank and driving-shaft to be in motion. If only so much work is to be done as can be performed with a short stroke, then all the parts will rotate together; but if the work to be done be so increased that the resistance cannot be overcome with a short stroke, then the crank-pin H, frame G, and case E will continue to revolve, while the shaft I will remain stationary for the time being; and the pinion *c* being engaged with the wheel J the screw K will revolve in the nut $b$, and this will move the sliding frame G and the crank-pin outward, increasing the length of the stroke and also the tension of the spring, which is the least when the parts are in the position shown in Fig. 3.

The shaft I will remain stationary, as above stated, and the other parts named will continue to rotate until the length of the stroke becomes sufficient to overcome the resistance and perform the work. Then the shaft, case, and crank-pin will again revolve together. When the work has been performed the action of the spring L will restore the parts to their former position.

Suppose the work is that of running an elevator. Sometimes only the elevator and an attendant are carried up; sometimes there will be a light load; sometimes a heavy one.

By the use of my device an adjustable crank is provided, acting automatically, if desired, to adapt itself to a long or short stroke; or the crank-pin can be adjusted by hand by means of a wrench applied to the end $e$ of the screw K, by turning which screw the pin H can be carried away from the center, as may be necessary, and can be set and held in a fixed position by means of the ratchet and pawl.

I have shown a single spring, L, located in the case E. Two or more springs could be there used. It is not necessary that the spring be located in this case. The sleeve C could be extended through the bearing B, and a disk be placed on the end thereof, outside of the bearing, to the face of which disk two spiral springs could be secured at one end, the other end of each spring being connected to a short chain, the other end of each chain being connected to the shaft.

As stated, my device is well adapted to be used with hydraulic engines, and will be the means of saving a large percentage of the water used in the usual manner when the work to be done varies materially.

Two or more cylinders may be used. When two are used they should be double-acting, and the pitman-rods may be located at right angles to each other.

It will usually be best to provide the devices which automatically adjust the crank-pin; but they may be omitted and the adjustment be made by hand only, in which case the spring and bevel-wheels and sleeve will not be used, and the shaft I may be of a uniform diameter; but a disk must be secured to or cast on the end of the shaft corresponding to the disk D. The other parts will remain the same as before, except that the rim may be narrower.

The screw K and the nut $b$ together form a positive lock for the crank-pin, holding it in any given position.

I do not limit myself to the exact means shown for connecting the screw K, frame G, and pin H with the shaft or sleeve. It is not necessary that E should be a complete rim.

When the sleeve C is not used the frame G could be secured to an arm or head made upon the end of the shaft I, an opening or slot being provided for the screw and nut.

When used with a hydraulic engine this device operates to regulate the speed as well as the flow of the water.

What I claim as new, and desire to secure by Letters Patent, is as follows:

1. The screw K, supported in suitable bearings, in combination with the locking-ratchet $d\ f$, nut $b$, movable crank-pin H, and shaft I, substantially as and for the purposes set forth.

2. The screw K, supported in suitable bearings, in combination with sliding plate G, crank-pin H, nut $b$, bevel-wheels J $c$, shaft I, and one or more springs, substantially as and for the purposes set forth.

3. The combination of the crank-pin H, sliding plate G, nut $b$, screw K, bevel-wheels J $c$, rim E, disk D, sleeve C, shaft I, and one or more springs, substantially as and for the purposes set forth.

4. The screw K, supported in suitable bearings, in combination with the nut $b$, sliding plate G, supporting-guides $h$, crank-pin H, and shaft I, substantially as and for the purposes set forth.

WILLIAM H. CLARK.

Witnesses:
E. A. WEST,
O. W. BOND.